UNITED STATES PATENT OFFICE.

SPENCER B. NEWBERRY, OF BAYBRIDGE, OHIO.

PROCESS OF RECOVERING ALKALIS FROM CEMENT-KILNS.

1,150,295.  Specification of Letters Patent.  Patented Aug. 17, 1915.

No Drawing.  Application filed March 14, 1913.  Serial No. 754,313.

*To all whom it may concern:*

Be it known that I, SPENCER B. NEWBERRY, a citizen of the United States of America, and resident of Baybridge, in the county of Erie and State of Ohio, have invented certain new and useful Improvements in Processes of Recovering Alkalis from Cement-Kilns, of which the following is a specification.

It is well known that certain materials from which Portland cement is made contain a considerable percentage of the alkalis, potash and soda, and that these alkalis are largely expelled in the calcination of cement mixtures to clinker. It is also known that the flue-dust deposited from the gases escaping from the kilns contains a higher proportion of alkalis than the raw mixture, and the possibility of recovering these alkalis from the flue-dust has often been discussed.

A long study of the expulsion of alkalis from cement kilns and analysis of a great number of samples of mix, clinker, flue-dust and stack gases have enabled me to establish the following facts: The amount of alkalis contained in the clinker, under given conditions of burning, is practically constant, and is not increased by increasing the proportion of alkalis in the raw mixture. The amount of alkalis remaining in the clinker can be greatly reduced, nearly to complete expulsion, by increasing the temperature of burning and time of exposure to high heat beyond the temperature and time ordinarily employed. Only a very small part of the alkalis volatilized in the kiln is deposited with the flue-dust, and this is contained in the flue-dust chiefly in a form insoluble in water. The remaining alkali can be almost completely recovered from the stack-gases by bringing the gases into intimate contact with finely divided sprays of water, or by passing the gases through a space fitted with porous material, the surfaces of which are kept wet with water. In this way is obtained a solution containing the smaller part of the alkali, in soluble form, and an insoluble sediment or mud, containing the larger part of the alkali, in insoluble form. If this insoluble matter is separated from the solution by filtering or subsidence, and is returned to the kiln with the fresh raw material, the percentage of alkali in the material is thereby increased, and since the alkali in the clinker remains practically constant, it follows that an increased amount of alkali is volatilized, and that a stronger solution and a mud richer in alkali are obtained. The proportion of soluble and insoluble alkali recovered remains practically the same, and in consequence, by continually returning to the kiln the flue-dust and mud containing insoluble alkali, a constantly increasing amount of soluble alkali is recovered, until, after a time, an amount of soluble alkali practically equal to the total alkali contained in the raw mixture supplied to the kiln is regularly obtained. For example, 600 lbs. of a dry raw mixture is required to produce 380 lbs. of cement clinker, corresponding to one barrel of finished cement. The raw mixture contains 1.33 per cent. potash, $K_2O$, or 8 lbs. per barrel, and the clinker 0.70 per cent., or 2.66 lbs. per barrel. 10 lbs. of flue-dust are deposited for each barrel of clinker obtained, and this contains 3.4 per cent. potash, or 0.34 lbs. per barrel. The amount of potash escaping with the stack-gases will therefore be as follows:

In 600 lbs. mix @ 1.33 per cent___ 8.00 lbs.
In 380 lbs. clinker @ 2.66
In 10 lbs. flue-dust @ 0.34_____ 3.00 lbs.

Total in stack-gases_____ 5.00 lbs.

Assuming, for simplicity, that all this potash can be recovered, by spraying and washing the gases, which in practice can be only approximately accomplished, the product recovered will be substantially as follows:

Soluble potash, in solution in water__ 2 lbs.
Insoluble potash, in 10 lbs. mud_____ 3 lbs.

If this mud and the flue-dust are now returned to the kiln with the fresh supply of raw material, the latter will now contain 8+0.34+3=11.34 lbs. potash per barrel, which will yield clinker containing 2.66 lbs., flue-dust containing 0.34 lbs., and gases carrying 8.34 potash. Of the latter, approximately two-fifths, or 3.34 lbs., will be recovered in soluble form, and 5 lbs. in the form of insoluble mud. Returning the latter again to the kiln, a further increased amount of soluble and insoluble potash will be obtained from the gases, until finally the gases will carry approximately 12.5 lbs. potash per barrel, of which 5 lbs. will be soluble, an amount equal to the total potash driven off from the fresh raw mixture, and thereafter the composition of the gases and the amount of soluble and insoluble potash recovered from them will be substantially constant.

In the above example, I have considered only the potash, as this is of much greater value than soda, and is generally present in cement mixtures in larger proportion than soda, and is much more readily volatilized than the latter in cement burning. It will be understood, therefore that the potash recovered from the stack-gases of cement kilns is always accompanied by more or less soda, and that the conditions of increased yield in soluble form by returning the insoluble alkali to the kiln, as above described, will apply to both potash and soda. It will be understood, also, that the above figures are intended only for illustration of the general principles of my process of recovery of alkalis, and that different cement materials will be found to vary considerably in percentage of alkalis contained and expelled, and in the proportion of the latter deposited with the flue-dust and recoverable, respectively, in soluble and insoluble form. The chemical combination in which the soluble alkalis are recovered differs according to the acid forming substances present in the mixture and fuel. With ordinary materials, containing one per cent. or less of alkalis, the latter are generally recovered in solution as sulfate and chlorid, along with a considerable proportion of sulfate and chlorid of calcium and magnesium. From mixtures rich in alkalis, however, such as are obtained by using feldspar or mica in place of clay or shale, and with fuels low in sulfur, a large part of the soluble alkalis are recovered in the form of carbonate.

An important result of my experiments has been the discovery that the amount of alkalis retained by the clinker varies greatly with the temperature and duration of the burning, and may be reduced to a minute percentage, not exceeding one-tenth to two-tenths per cent., by maintaining in the hottest zone of the kiln a temperature somewhat higher than that usually employed, but not sufficiently high to fuse the clinker or injure the resulting cement, or by holding the clinker somewhat longer than usual in the zone of highest heat. The latter can easily be accomplished by means of a ring of firebrick inside the lining at the discharge end of the kiln, which has the effect of holding a greatly increased volume of clinker in the hot zone, and thus retarding the rate of travel of the clinker through this part of the kiln.

Another device which I have found of great advantage in effecting the recovery of the maximum amount of alkalis is to cool the gases from the kiln, after they have been freed from most of the suspended flue-dust by passing through suitable dust chambers, by bringing the gases into contact with heat-conducting surfaces. These surfaces may with advantage take the form of the tubes of water-tube boilers, filled with water, by which the gases are reduced in temperature from perhaps 1800° F., at which they leave the kiln, to 500° or 600° F. A large amount of steam, available for generating power, may be obtained in such boilers, and the gases are at the same time freed from a further quantity of flue-dust and cooled to a point at which they can be effectively treated for alkali-recovery by washing with a small volume of water. The heat conducting surface may also consist of the tubes of economizers for heating boiler-feed water, or the tubes of air-heating coils for heating the air-blast of the kiln.

After leaving the heat absorbing surfaces, the gases may with advantage be conducted under pans in which the solution of alkali-metal salts, obtained by washing the gases, is evaporated to dryness. The gases then pass to the absorbing apparatus, preferably consisting of a tower, the lower part of which consists of a reservoir for solution, above which is an empty section provided with a number of water sprays, in which the gases are brought into intimate contact with water or alkali-metal salt solution in a very finely divided condition and are thus effectively freed from suspended insoluble and soluble matter. Above the spray-chamber is a section of the tower filled with a loose checker-work of brick or loosely-piled porous material such as coke, the surfaces of which may be kept wet by means of an additional water spray at the top of the tower. The effect of this device is to free the gases to a great extent from suspended minute drops of solution in the form of a fog, by collecting these into larger drops and streams and thus preventing their escape with the gases discharged from the tower. At the top of the absorbing apparatus is placed an exhaust fan, the capacity and speed of which are so adjusted as to remove and discharge the treated gases and to maintain a suitable draft in the kiln.

The sprays are preferably supplied with alkali-metal salt solution, drawn by a pump from the reservoir at the base of the tower, to which water is added as required to make up for that evaporated by the heat of the gases. In this way the solution becomes concentrated by absorption of further portions of alkalis, and is collected, with a considerable amount of insoluble mud, in the reservoir. A portion of the solution is continuously or from time to time removed and evaporated to dryness or to the point of crystallization of alkali-metal salts, in the pans above mentioned. The mud settles rapidly from the solution, and may be removed at intervals by suitable devices, or the liquid and mud may be drawn from the tower into separate reservoirs, and after settling or filtering, the clarified liquid is returned to the tower. The mud, and preferably also the flue-dust, are returned to the kiln with the fresh raw material introduced.

By operating substantially as above described I am able to recover practically all the alkalis, hitherto lost from cement kilns with the stack-gases, in the form of water-soluble salts, containing from 30 to 50 per cent. of alkalis, chiefly potash, and thus to obtain a by-product of cement manufacture, in extensive quantities, which is of great value in agriculture and the chemical arts.

Having thus described the invention, what is claimed is:

The process of recovering alkalis from the stack-gases of cement kilns, which consists in separating flue-dust from the gases, cooling the gases by contact with heat-absorbing surfaces, washing the gases with aqueous liquid, freeing the washed gases from suspended liquid by passing them through a porous layer, separating insoluble matter from the solution of alkali-metal salts so obtained, returning the flue-dust and insoluble matter to the kiln, evaporating part of the solution and returning the remaining solution to the liquid used for washing the gases.

In testimony whereof I affix my signature in presence of two witnesses.

SPENCER B. NEWBERRY.

Witnesses:
HATTIE M. MEGGITT,
HARVEY N. BARRETT.